US009588330B2

(12) United States Patent
Phillips et al.

(10) Patent No.: US 9,588,330 B2
(45) Date of Patent: Mar. 7, 2017

(54) TOMOGRAPHIC BRIGHT FIELD IMAGING (TBFI)

(71) Applicants: Kevin Phillips, Portland, OR (US); Owen J. McCarty, Portland, OR (US); Steven L. Jacques, Portland, OR (US)

(72) Inventors: Kevin Phillips, Portland, OR (US); Owen J. McCarty, Portland, OR (US); Steven L. Jacques, Portland, OR (US)

(73) Assignee: OREGON HEALTH & SCIENCE UNIVERSITY, Portland, OR (US)

( * ) Notice: Subject to any disclaimer, the term of this patent is extended or adjusted under 35 U.S.C. 154(b) by 0 days.

(21) Appl. No.: 14/316,074

(22) Filed: Jun. 26, 2014

(65) Prior Publication Data

US 2015/0003714 A1    Jan. 1, 2015

Related U.S. Application Data

(60) Provisional application No. 61/840,596, filed on Jun. 28, 2013.

(51) Int. Cl.
G02B 21/36 (2006.01)
G06T 7/00 (2006.01)
G06T 11/00 (2006.01)

(52) U.S. Cl.
CPC .......... *G02B 21/367* (2013.01); *G06T 7/0083* (2013.01); *G06T 11/003* (2013.01); *G06T 2207/10101* (2013.01)

(58) Field of Classification Search
None
See application file for complete search history.

(56) References Cited

U.S. PATENT DOCUMENTS

| 6,496,188 | B1 * | 12/2002 | Deschamps et al. | 345/419 |
| 2007/0171433 | A1 * | 7/2007 | Tearney et al. | 356/614 |
| 2013/0057869 | A1 * | 3/2013 | Cotte et al. | 356/457 |

* cited by examiner

*Primary Examiner* — Jon Chang
(74) *Attorney, Agent, or Firm* — Jeffrey M. Jackson

(57) ABSTRACT

Disclosed herein is a method of tomographic bright field imaging (TBFI): an optical imaging technique that enables the measurement of cellular refractive index and dry mass density using a standard transillumination optical microscope and software embodying said method.

10 Claims, 11 Drawing Sheets

TOMOGRAPHIC BRIGHT FIELD IMAGING (TBFI)

ACKNOWLEDGEMENT OF GOVERNMENT SUPPORT

This invention was developed with the support of the United States government under the terms of grant numbers 5 U54 CA143906 and 1 R01 HL101972 awarded by the National Institutes of Health. The United States government has certain rights to this invention.

FIELD

Generally, the field involves imaging. More specifically the field involves phase contrast light microscopy in cellular imaging.

BACKGROUND

The use of high magnification optical microscopy has become an indispensable resource in the investigation of cellular organisms. Owing to their low endogenous absorbance and weak scattering properties over the visible optical spectrum, cells primarily affect the phase of optical waves traveling through them and thus appear semitransparent when imaged with standard bright field microscopes. This fact has inspired the utilization of phase to enhance contrast in cellular imaging (e.g., phase contrast and differential interference contrast microscopy) and quantify cellular structure Preza C et al, in Handbook of Biomedical Optics, D Boas, C Pitris and N Ramnujam eds, Taylor and Francis Books, London 2011, p 483; Shaked N T et al, Biomed Opt Express 1, 706 (2010); Wang Z et al, Opt Express 19, 19907 (2011); all of which are incorporated by reference herein). While the use of phase contrast and differential interference contrast microscopy in qualitative investigations of cellular morphology has become widespread, the use of quantitative phase retrieval methods and their connection to cellular refractive index and dry mass density (Barer R, Nature 172, 1097 (1953); incorporated by reference herein) remain confined to a handful of laboratories. This is a result of the restriction of phase and cellular mass determination to custom built instruments (Wang et al, 2011 supra and Charrire F et al, Opt Lett 31, 178 (2006) and Choi W et al, Nat Methods 4, 717 (2007); both of which are incorporated by reference herein), involved mathematical analysis (Klibanov M V et al, Inverse Probl 11, 1 (1995); incorporated by reference herein), and prohibitive sample perturbations (Barer, 1953 supra).

SUMMARY

Described herein is a method of tomographic bright field imaging (TBFI)—an optical imaging technique that enables the measurement of cellular refractive index and dry mass density using a standard transillumination optical microscope.

TBFI is a technologically accessible label-free imaging modality capable of quantifying cellular refractive index, mass, volume, and density of multiple biological specimens simultaneously. TBFI is readily extended to live cell imaging to monitor growth dynamics over time, subcellular architecture, studies of sample dispersion properties (Subramanian H et al, Proc Natl Acad Sci USA 105, 20118 (2008); incorporated by reference herein) through the use of multiple color filters, e.g., liquid crystal tunable filters, and is readily utilized in parallel with phase contrast enhancement techniques (Kou S S et al, Opt Lett 35, 447 (2010); incorporated by reference herein), and fluorescence microscopy on standard optical microscopes.

In one example approach, the method involves creating or obtaining one or more image cubes, processing those image cubes using a transport of intensity equation and processing those image cubes using an eikonal equation.

In other examples, the method involves measuring the intensity of light passing through a sample at a set of z-planes, so as to create a set of 2-D measurements of the sample. The 2-D measurements are then combined to form a 3-D image cube. The image cube is then processed using a TBFI algorithm comprising at least a transport of intensity equation (TIE) and an Eikonal equation.

In other examples of the method, the TBFI algorithm further comprises a first convolution theorem. In those examples, processing results in a 3-D image cube of phase values.

In other examples, the TBFI algorithm further comprises a relation to the refractive index and a second convolution theorem. In those examples, the processing results in a 3-D image cube of refractive index values.

In still other examples, the TBFI algorithm further comprises a relation to the refractive index, a second convolution theorem and a calibration model. In those examples, the processing results in a 3-D image cube of mass density profile values.

In additional examples, the method comprises post processing of the 3-D image cube by defining the borders of the 3-D image cube. The post processing may further comprise determining the volume of the sample, determining the dry mass density of the sample and/or determining the mass of the sample. In further examples, these are determined using equations (6) (8) and (9) described below.

Also disclosed herein is software embodying any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4A is an en face bright field image of a 0.1 μm polystyrene sphere (n=1.597, imaging wavelength λ=540 nm), suspended in fluoromount G (n=1.4)

FIG. 4B is a refractive index map correlating to the image of FIG. 4A.

FIG. 4C is a cross sectional image of a 0.1 μm sphere.

FIG. 4D is a refractive index map correlating to the image of FIG. 4C.

FIG. 4E is an en face bright field image of a 2.8 μm polystyrene sphere suspended in glycerol (n=1.474).

FIG. 4F is a refractive index map correlating to the image of FIG. 4E.

FIG. 4G is a cross sectional bright field image of the 2.8 μm polystyrene sphere.

FIG. 5A is a bright field image of water in a 100 μm wide fused silica microfluidic channel, air coupled ×10 lens with NA=0.25.

FIG. 5B is a bright field image of a 4.8 μm diameter polystyrene sphere suspended in glycerol with an oil coupled lens with NA=1.4.

FIG. 5C is a refractive index map of water, n=1.333 in a glass microfluidic channel, n=1.460.

FIG. 5D is a refractive index map of a 4.8 μm diameter polystyrene sphere n=1.597 in glycerol n=1.474.

FIG. 5E is a line graph showing the average refractive index profile plotted against the x direction for the channel.

FIG. 5F is a line graph showing the refractive index along the diagonal of the refractive index map of FIG. 5D.

FIG. 6A is a bright field intensity image of red blood cells.

FIG. 6B is a refractive index map of red blood cells computed using the disclosed method.

FIG. 6C is a mass density map of red blood cells using the hemoglobin calibration reported in Friebel and Meinke, 2006 infra.

FIG. 6D is a set of three bright field intensity images at 0 and ±0.4 μm of the individual red blood cell indicated in the box in FIGS. 6A, 6B, and 6C.

FIG. 6E is a set of three refractive index maps corresponding to the images in FIG. 6D.

FIG. 6F is a set of three mass density maps corresponding to the images in FIG. 6D.

FIG. 6G is an xz projection average of bright field intensity corresponding to the images in FIG. 6D.

FIG. 6H is an xz projection of refractive index corresponding to the images in FIG. 6E.

FIG. 6I is an xz projection of mass density corresponding to the images in FIG. 6F.

DETAILED DESCRIPTION

The following detailed description is directed methods of tomographic bright field imaging (TBFI)—an optical imaging technique that enables the measurement of cellular refractive index and dry mass density using a standard transillumination optical microscope. In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents. Various operations may be described as multiple discrete operations in turn, in a manner that may be helpful in understanding embodiments; however, the order of description should not be construed to imply that these operations are order dependent.

TBFI is an extension of quantitative noninterferometric propagation-based phase determination methods based on the transport of intensity equation (TIE) (Paganin D and Nugent K A, Phys Rev Lett 80, 2586 (1998) and Frank J et al, J Opt Soc Am A 27, 2244 (2010); both of which are incorporated by reference herein). Posed under the paraxial approximation to the full wave dynamics, TBFI relates intensity disturbances along the optical axis in the wave field to transverse (perpendicular to the optical axis) refractive index variations of the medium. The method is thus applicable only to specimens with transverse index gradients. The appropriateness of the paraxial approximation is ensured by the weak index contrast of biological specimens and the illumination of the object with collimated unidirectional monochromatic plane waves. These waves are easily produced on standard microscope setups employing low numerical aperture (NA=0.2) condenser lenses in a Köhler configuration with a narrow band color filter (λ=540±20 nm) placed in the illumination arm of the instrument.

Figure 1:
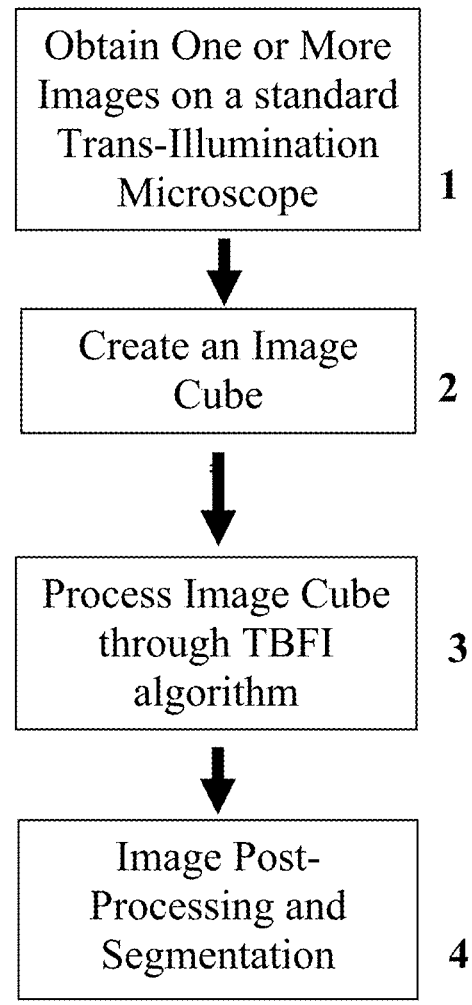
FIG. 1 is a flow chart illustrating an exemplary method of performing TBFI.

FIG. 1 illustrates one example of the disclosed method. One or more images of a sample are acquired using a standard transillumination microscope 1. The acquired images are assembled to create an image cube 2. An image cube is a three dimensional representation of the sample constructed using one or more types of information from the acquired images. The image cube is then processed using the TBFI algorithm 3 to acquire quantitative information about the image cube. Finally, the processed image cube is subjected to post-processing and segmentation so as to determine quantitative information about the sample 4.

Figure 2:
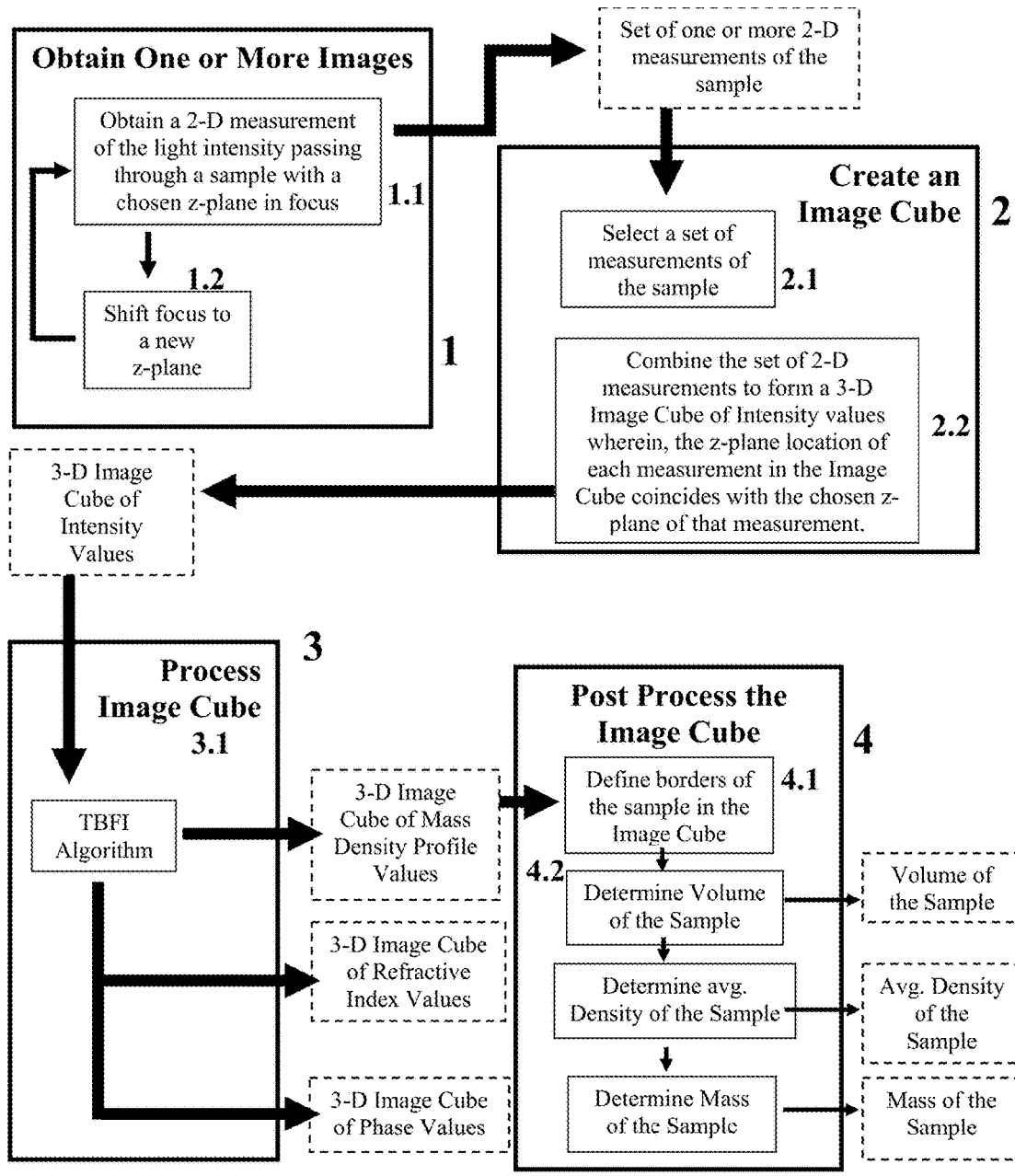
FIG. 2 is a flow chart illustrating a second exemplary method of performing TBFI.

FIG. 2 illustrates another example of the disclosed method. In FIG. 2, the actions of obtaining the one or more of the images described in box 1 further comprises obtaining a 2-D measurement (in the x-y plane) of the light intensity passing through a sample with a chosen z-plane in focus 1.1, shifting the focus to a new z-plane 1.2, and repeating these two actions until a set of 2-D measurements of the sample comprising a desired number of measurements has been obtained.

FIG. 2 further illustrates actions that can be involved in creating an image cube in box 2. To create the image cube, the set of 2-D measurements of the light intensity passing through the sample (or a selected subset thereof) is selected 2.1, and the measurements of the set are combined to form a 3-D image cube wherein the z-plane location of each image in the image cube coincides with the chosen z-plane of that measurement. The resulting image cube is a map of the light intensity passing through different points in the sample in three dimensions.

FIG. 2 additionally illustrates the actions of processing of the image cube in box 3. Processing of the image cube involves using the TFBI algorithm 3.1. Examples of quantitative information which may be created by the TBFI algorithm include a 3-D Image cube of mass density profile values for the sample, a 3-D image cube of refractive index values for the sample, and a 3-D image cube of phase values for the sample.

FIG. 2 also illustrates subjecting the processed image cube resulting from the actions described in box 3 to further post processing and segmentation by the actions described in box 4. This comprises defining the borders of the sample in the image cube 4.1, determining the volume of the sample 4.2, determining the average density of the sample 4.4, and determining the mass of the sample 4.6. Examples of quantitative information which may be derived from such post processing and segmentation 4 include; the volume of the sample, the average density of the sample, and the mass of the sample.

Figure 3:
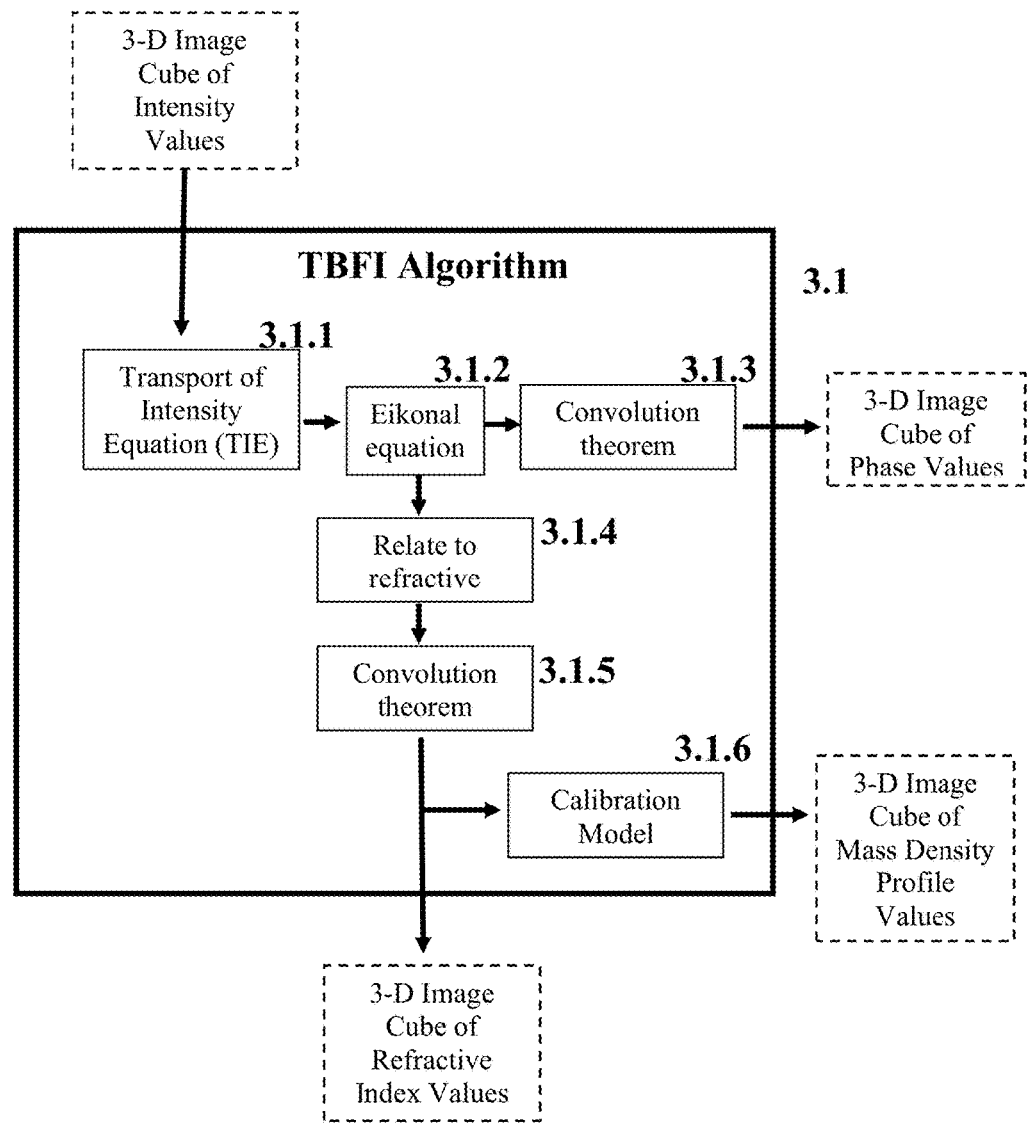
FIG. 3 is a flow chart of an example of the TBFI algorithm.
Figure 4A:
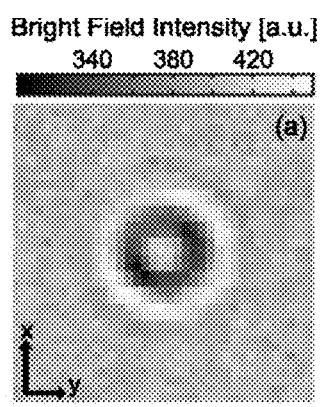
FIGS. 4A, 4B, 4C, 4D, 4E, 4F, and 4G is a set of images of three dimensional TBFI refractive index reconstructions of polystyrene spheres.
Figure 4B:
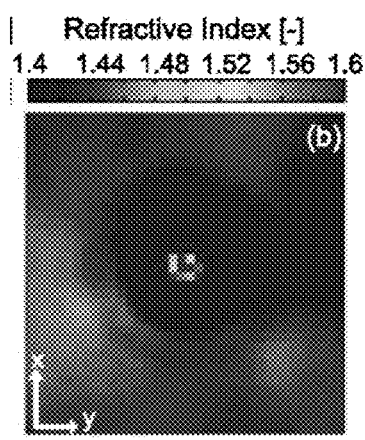
Figure 4C:
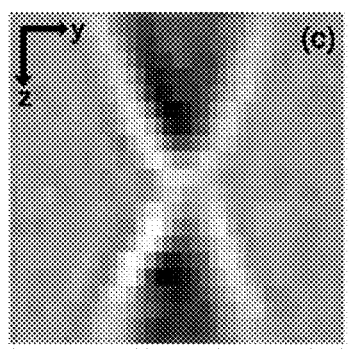
Figure 4D:
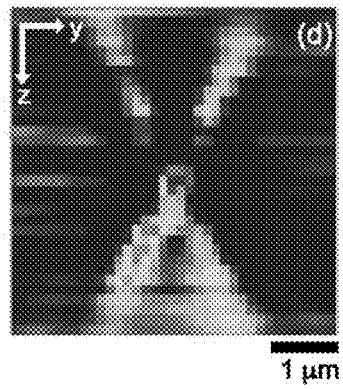
Figure 4E:
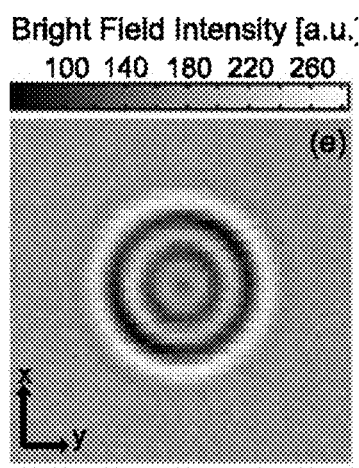
Figure 4F:
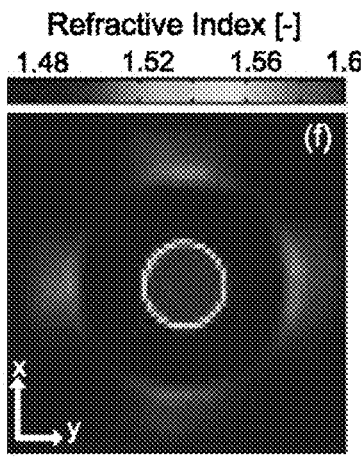
Figure 4G:
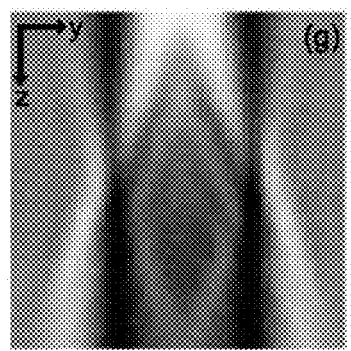
Figure 4H:
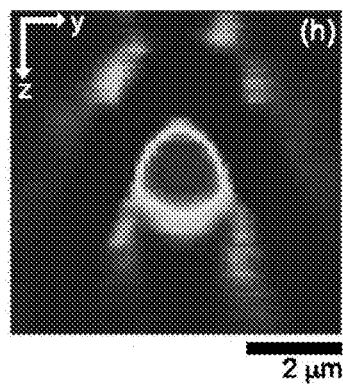
FIG. 4H is a refractive index map correlating to the image of FIG. 4G.

FIG. 3 is a detailed illustration of the TBFI Algorithm 3.1. The TBFI algorithm includes the following actions: the image cube is transformed using the transport of intensity equation (TIE) 3.1.1 and the Eikonal equation 3.1.2. The resulting transformed image cube can then be subjected to the convolution theorem 3.1.3 to create an image cube of phase values. Alternatively, the transformed image cube can be related to the refractive index 3.1.4 and then subjected to the convolution theorem 3.1.5 to obtain an image cube of the refractive index values. The image cube of refractive index values can be related to a calibration model 3.1.6 to create an image cube of mass density profile values.

The TBFI method can also include an image acquisition and post-processing procedure: through focus bright field images, acquired with a charge coupled device (CCD) camera mounted on a standard microscope can serve as the input to the TBFI model from which the specimen refractive index and mass density are determined using a fast Fourier transform based numerical method.

To develop the TBFI formalism, three dimensional coordinates $(r_\perp, z)$ were defined where z denotes the position along the optical axis and $r_\perp$ the position within a plane normal to the optical axis. $\nabla_\perp$ is the gradient and $\Delta_\perp$ the Laplacian in $r_\perp$ coordinates. Defining the wave field traversing the specimen by;

$$U(r_\perp, z) = \sqrt{I(r_\perp, z)} e^{i\phi(r_\perp, z)}$$

where I is the intensity and $\phi$ the phase, the TIE is obtained by substituting U into the paraxial wave equation and taking the imaginary part of the resulting expression; the eikonal equation arises from the real terms. Letting $k=2\pi/\lambda$, the TIE is given by;

$$-k \frac{\partial}{\partial z} I(r_\perp, z) = \nabla_\perp \cdot [I(r_\perp, z) \nabla_\perp \varphi(r_\perp, z)] \quad \text{Equation (1)}$$

with boundary conditions; $I(r_\perp, z) \geq 0$ in L×D, and $I(r_\perp, z) = 0 \partial L \times \partial X$ (Frank J, et al, 27 *J. OPT. SOC. AM.* 2244 (October 2010) incorporated by reference herein)

Denoting the trajectory of waves through the sample by the parametric curve $\vec{p}(s)$, $s \in [0, 1]$, phase distortions induced in the wave field as the wave propagates from point $\vec{p}(0) = (r_0, z_0)$ to $\vec{p}(1) = (r_\perp, z)$ can be related to the refractive index, $n(r, z)$, of the specimen through solutions to the eikonal equation for phase;

$$\phi(\vec{p}(l)) - \phi(\vec{p}(0)) = k \int_0^l n(\vec{p}(s)) |\vec{p}'(s)| \partial s. \quad \text{Equation (2)}$$

(Ishamaru A, *Wave Propagation and Scattering in Random Media II*, Ch. 7, Academic Press (1978); incorporated by reference herein).

The objective lens of the microscope images spherical waves emanating from the sample plane onto the CCD camera while plane waves are out of focus due to the Köhler illumination conditions. As a result, waves contributing to image formation do not propagate solely along the optical (z) axis; their deviation is slight enough however (as detailed by Mie theory and the Born approximation for weak index contrast systems) to satisfy the constraints of the PA. The optical sectioning of the sample, due to spatial frequency space filtration by the objective lens under the Bragg condition, ensures that phase contributions to the spherical waves leaving the sample plane are specific to that plane when imaged onto the CCD camera. Moreover, the waves contributing to image formation, ignoring out-of-focus contributions, can be considered as plane waves up to their interaction inside the focal volume of the objective lens. This is justified by the first order Born approximation in which weak index systems do not give rise to appreciable multiple scattering. Together, these properties enable the restriction of Eq. (2) to straight-line trajectories of wave energy along the optical axis through the sample:

$$\vec{p}(s) \approx s\hat{k}:.$$

Letting $(r_0, z_0)$ be the origin, swapping dummy variable s with z', and taking the specimen to be located directly above the origin, hence $\phi(r_0, z_0) = 0$, for points inside the specimen we find $\phi(r_\perp, z) = k \int_0^z n(r_\perp, z') dz'$. Substitution of this integral expression for phase into the TIE, followed by a subsequent differentiation in z yields the TBFI imaging model: an equation relating the measurable axial intensity variations to the refractive index of the sample $$-\frac{\partial^2 I}{\partial z^2} + \nabla_\perp \cdot \left\{ \frac{\partial I}{\partial z} \left\{ I^{-1} \nabla_\perp \left[ \nabla_\perp^{-2} \frac{\partial I}{\partial z} \right] \right\} \right\} = \nabla_\perp [I \nabla_\perp, n]$$

In the development of this expression the identity $$\nabla_\perp \varphi = -(k/I) \nabla_\perp \left[ \nabla_\perp^{-2} \frac{\partial I}{\partial z} \right]$$

was used (D. Paganin & K. A. Nugent, *Physical R. Letters* 80, 2586 (1998); incorporated by reference herein).

A solution for the refractive index was developed. Letting G denote the Green function of the Laplacian in $\mathbb{R}^2$, the refractive index has the formal representation;

$$n(r_\perp, z') = \quad \text{Equation (4)}$$
$$-\int_{\mathbb{R}^2} \frac{\partial}{\partial z} \left\{ \left[ I(r'_\perp, z)^{-1} \right]_\perp \left( \frac{\partial}{\partial z} I(r''_\perp, z) \right) \cdot \nabla_{\perp''} G(r'_\perp, r''_\perp) dr''_\perp \right\} \cdot$$
$$\nabla_{\perp'} G(r_\perp, r'_\perp) \} dr'_\perp$$

The numerical implementation of this formula can be carried out in a practical manner, via the convolution theorem, as the application of several two dimensional Fourier transforms, denoted by $\mathcal{F}$:

$$n(r_\perp, z') = -\mathcal{F}^{-1}\left\{ \frac{k_x}{k_x^2 + k_y^2} \mathcal{F}\left\{ I^{-2} \frac{\partial I}{\partial z} \mathcal{F}^{-1}\left\{ \frac{k_x}{k_x^2 + k_y^2} \mathcal{F} \frac{\partial I}{\partial z} \right\} \right\} \right\} + \quad \text{Equation (5)}$$
$$\mathcal{F}^{-1}\left\{ \frac{k_x}{k_x^2 + k_y^2} \mathcal{F}\left\{ I^{-1} \mathcal{F}^{-1}\left\{ \frac{k_x}{k_x^2 + k_y^2} \mathcal{F} \frac{\partial^2 I}{\partial z^2} \right\} \right\} \right\} -$$
$$\mathcal{F}^{-1}\left\{ \frac{k_y}{k_x^2 + k_y^2} \mathcal{F}\left\{ I^{-2} \frac{\partial I}{\partial z} \mathcal{F}^{-1}\left\{ \frac{k_y}{k_x^2 + k_y^2} \mathcal{F} \frac{\partial I}{\partial z} \right\} \right\} \right\} +$$
$$\mathcal{F}^{-1}\left\{ \frac{k_y}{k_x^2 + k_y^2} \mathcal{F}\left\{ I^{-1} \mathcal{F}^{-1}\left\{ \frac{k_y}{k_x^2 + k_y^2} \mathcal{F} \frac{\partial^2 I}{\partial z^2} \right\} \right\} \right\}.$$

Through-focus intensity images are used to approximate the axial intensity derivatives appearing in Eq. (5) using finite differences. Here $k_x$ and $k_y$ denote the spatial frequency variables corresponding to the coordinates x and y, respectively. Low frequency noise contributions are eliminated by taking $$\frac{k_{x,y}}{k_x^2 + k_y^2} = 0$$

for $k_{x,y}=0$. With the elimination of these "dc" frequency components, a knowledge of the ambient refractive index is required to set the absolute scale for the refractive index.

EXAMPLES

The following examples are illustrative of disclosed methods. In light of this disclosure, those of skill in the art will recognize that variations of these examples and other examples of the disclosed method would be possible without undue experimentation.

Example 1

Three-Dimensional TBFI Refractive Index Reconstructions of Polystyrene Spheres In FIG. 4, three-dimensional TBFI refractive index reconstructions of 0.1 μm diameter spheres are demonstrated. In FIGS. 4A, 4B, 4C, and 4D, 0.1 μm diameter spheres were suspended in fluoromount G (SouthernBiotech, Birmingham, Ala.) (n=1.4) and 2.8 μm spheres. In FIGS. 4E, 4F, 4G, and 4H, the spheres were suspended in glycerol (n=1.474) TBFI reconstructions of the 0.1 μm spheres demonstrated an enhancement of the theoretical transverse diffraction limit of the system (=1.22λ/(NA$_o$+NA$_c$)=0.41 μm) with a measured transverse resolution of 0.26 μm (FIG. 4B). The axial resolution was measured to be 0.35 μm (FIG. 4D). Reconstructions on 0.1 μm diameter spheres were subject to higher noise during image acquisition which translated to artifacts in the reconstructions (FIG. 4D). Reconstruction of the 2.8 μm diameter spheres enjoyed higher signal to noise ratios during image acquisition and were successful in capturing the cross sectional geometry of the sphere (FIG. 4H).

Example 2

TBFI Refractive Index Reconstructions of the Central Focal Plane of Thicker Specimens Polystyrene spheres larger than 2.8 μm in diameter are difficult to reconstruct as diffraction effects nullify the paraxial TBFI model assumptions. However, in the central plane of larger objects in which diffraction effects are minimized, the refractive index can be reconstructed.

Figure 5A:
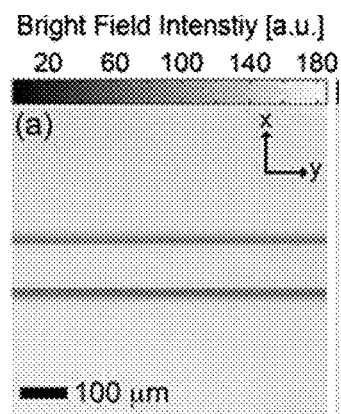
FIGS. 5A, 5B, 5C, 5D, 5E, and 5F collectively show the TBFI refractive index reconstructions of the central focal plane in thicker specimens. Shaded bars in FIG. 5E and FIG. 5F denote ±1%.
Figure 5B:
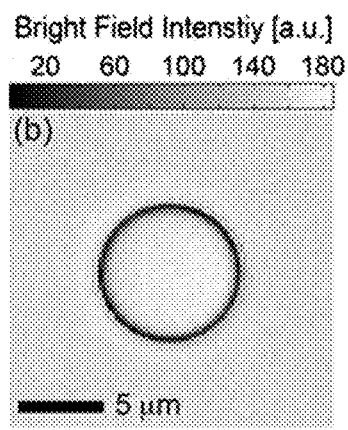
Figure 5C:
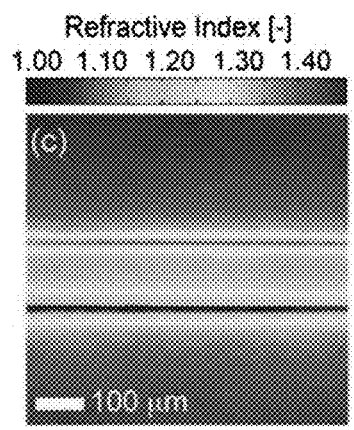
Figure 5D:
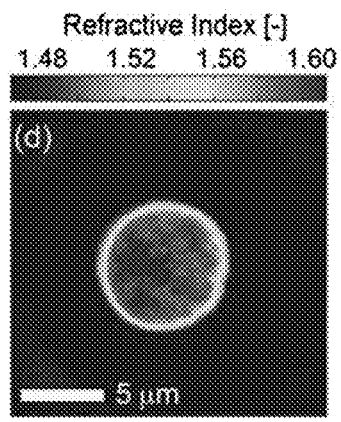
Figure 5E:
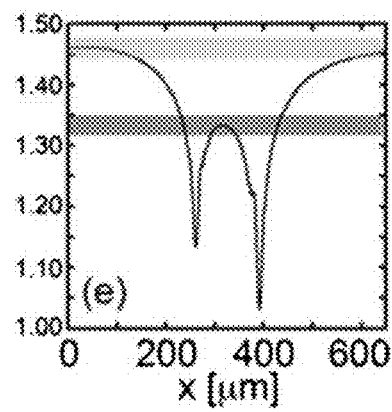
Figure 5F:
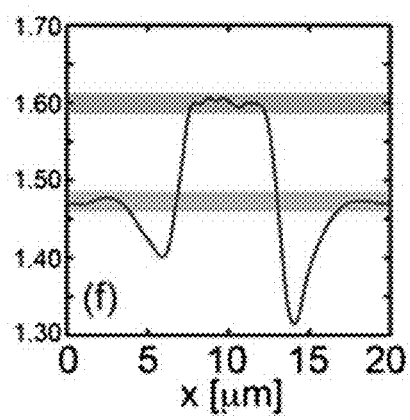

In FIG. 5A an example bright field image of water in a 100 μm deep by 100 μm wide microfluidic channel is demonstrated. The corresponding refractive index map is shown in FIG. 5C. FIG. 5B and FIG. 5D demonstrate a bright field image and corresponding refractive index map for a 4.8 μm diameter polystyrene sphere suspended in glycerol. In both experiments, the recovered refractive indices were found to fluctuate within a 1% range around the accepted values (FIGS. 5E and 5F). Shaded bars denote a 1% range.

Example 3

Determining Biological Parameters in Cellular Specimens

For biological applications on cellular specimens, the dry mass density, C [g/dL], can be inferred from the refractive index through a linear calibration model (Friebel M and Meinke M Appl Opt 45, 2838 (2006); incorporated by reference herein).

$$n(r_\perp, z) = n_{H_2O}[\alpha(\lambda)C(r_\perp, z) + 1].\qquad\text{Equation (6)}$$

$\alpha(\lambda)$ [dL/g] is the specific refractive increment of the cell solids: for nucleated cells $\alpha=0.002/n_{H_2O}$ independent of $\lambda$, while for hemoglobin (Hb) rich red blood cells $\alpha(\lambda)$ =0.001981 at $\lambda$=540 nm.

To demonstrate the ability of TBFI to recover properties of biological specimens, we applied the technique, with the optimized axial increments from the sphere calibration, to the measurement of the mass, volume, and density of 20 red blood cells (RBCs) at ×63 magnification. Peripheral blood was obtained from a healthy volunteer, dispersed onto a glass microscope slide and fixed with paraformaldehyde. A coverslip was mounted over the RBCs using fluoromount G.

Figure 6A:
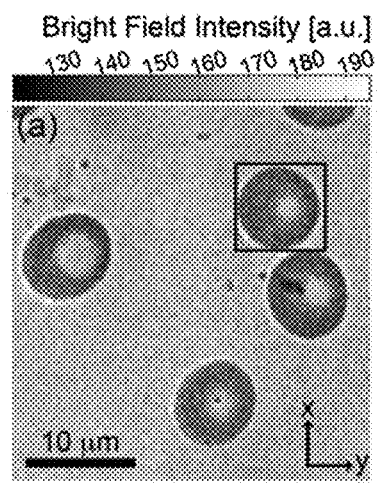
FIGS. 6A, 6B, 6C, 6D, 6E, 6F, 6G, 6H, and 6I collectively show the TBFI reconstruction of the refractive index and dry mass density of red blood cells.
Figure 6B:
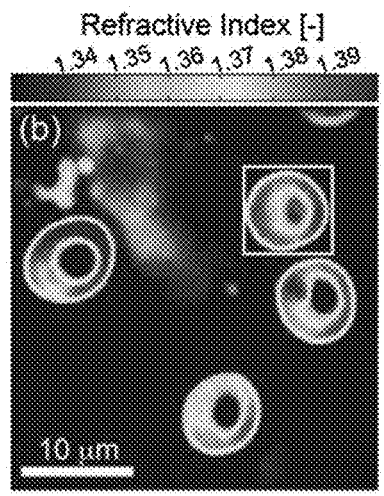
Figure 6C:
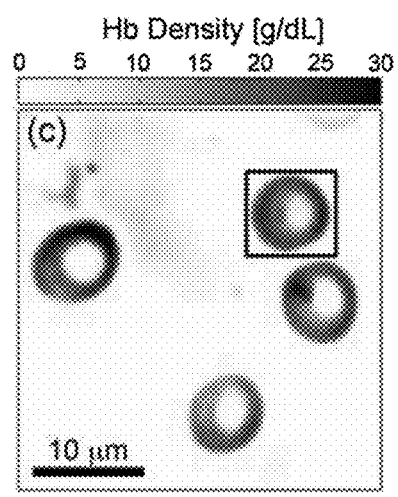
Figure 6D:
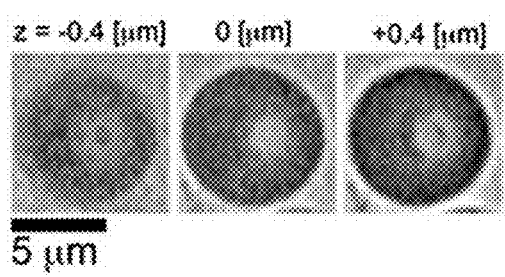
Figure 6E:
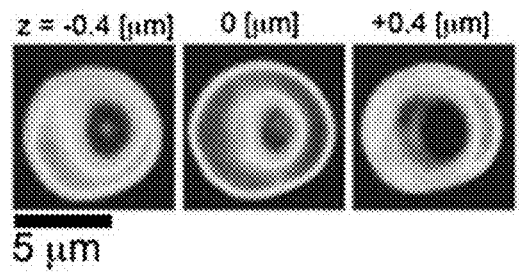
Figure 6F:
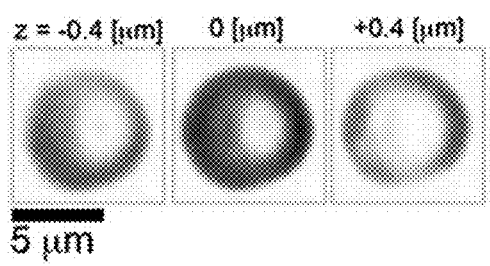
Figure 6G:
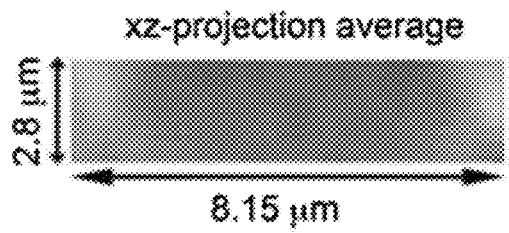
Figure 6H:
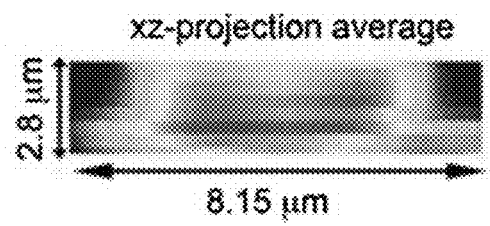
Figure 6I:
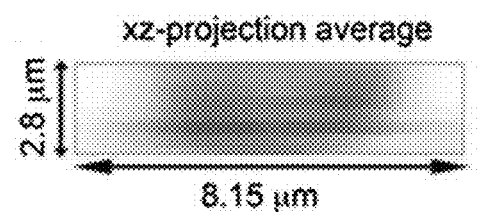

FIG. 6A demonstrates the bright field image of RBCs. FIG. 6B demonstrates the in-plane refractive index, and FIG. 6C demonstrates the in-plane mass density at the central focus position. The recovered refractive index and mass density are reported in planes ±0.4 μm about the central focal position of a single RBC (FIG. 6E and FIG. 6F respectively,) along with the xz projection average of these quantities over the axial extent of the RBC (FIGS. 6H and 6I). The Cartesian product of the xz, yz, and en face projection averages of the RBCs was used to generate a three dimensional characteristic function, X, for the extent of the cell: letting D denote the spatial collection of voxels comprising the cell, $X(r_\perp, z)=1$ if $(r_\perp, z) \in D$, $X(r_\perp, z)=0$ if $(r_\perp, z)\notin D$ The mass and volume were then computed according to:

$$M = \int_D C(r_\perp, z) X(r_\perp, z) dr_\perp dz \qquad\text{Equation (8)}$$

$$V = \int_D X(r_\perp, z) dr_\perp dz. \qquad\text{Equation (9)}$$

As measured by TBFI, red blood cells were found to have an average refractive index of 1.402±0.008, (all quantities mean±standard deviation), in keeping with Hb associated refractive index values at λ=540 nm reported in past studies, an average dry mass of 27.2±5.3 [pg], volume 100.7±17.9 [fL], and density 27.1±3.1 [pg/fL] (or [g/mL]); all within physiological norms (Lichtman M, *Williams Hematology*, McGraw Hill Professional, New York (2005); incorporated by reference herein.)

In some embodiments, the above described methods and processes may be tied to a computing system, including one or more computers. In particular, the methods and processes described above with regard to FIGS. 1-3, may be implemented as a computer application, computer service, computer API, computer library, and/or other computer program product.

Figure 7:
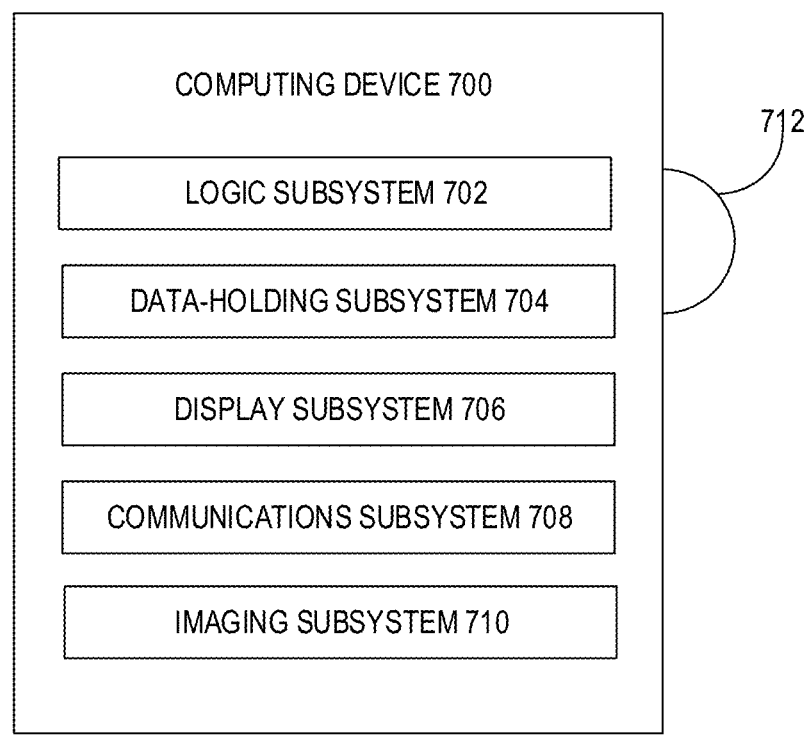
FIG. 7 schematically shows an example computing system in accordance with the disclosure.

FIG. 7 schematically shows a non-limiting computing device 700 that may perform one or more steps of the above described methods and processes. Computing device 700 is shown in simplified form. It is to be understood that virtually any computer architecture may be used without departing from the scope of this disclosure. In different embodiments, computing device 700 may take the form of a microcomputer, an integrated computer circuit, microchip, a mainframe computer, server computer, desktop computer, laptop computer, tablet computer, home entertainment computer, network computing device, mobile computing device, mobile communication device, gaming device, etc.

Computing device 700 includes a logic subsystem 702 and a data-holding subsystem 704. Computing device 700 may optionally include a display subsystem 706 and a communication subsystem 708, and/or other components not shown in FIG. 7. Computing device 700 may also optionally include user input devices such as manually actuated buttons, switches, keyboards, mice, game controllers, cameras, microphones, and/or touch screens, for example.

Logic subsystem 702 may include one or more physical devices configured to execute one or more machine-readable instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. For example, the one or more processors may comprise physical circuitry programmed to implements one or more steps of one or more methods described herein. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 704 may include one or more physical, non-transitory devices configured to hold data and/or instructions executable by the logic subsystem to implement the herein described methods and processes. When such methods and processes are implemented, the state of data-holding subsystem 704 may be transformed (e.g., to hold different data).

Data-holding subsystem 704 may include removable media and/or built-in devices. Data-holding subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 704 may include devices with one or more of the following characteristics: volatile, nonvolatile, dynamic, static, read/write, read-only, random access, sequential access, location addressable, file addressable, and content addressable. In some embodiments, logic subsystem 702 and data-holding subsystem 704 may be integrated into one or more common devices, such as an application specific integrated circuit or a system on a chip.

FIG. 7 also shows an aspect of the data-holding subsystem in the form of removable computer-readable storage media 712, which may be used to store and/or transfer data and/or instructions executable to implement the herein described methods and processes. Removable computer-readable storage media 712 may take the form of CDs, DVDs, HD-DVDs, Blu-Ray Discs, EEPROMs, flash memory cards, and/or floppy disks, among others.

When included, display subsystem 706 may be used to present a visual representation of data held by data-holding subsystem 704. As the herein described methods and processes change the data held by the data-holding subsystem, and thus transform the state of the data-holding subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or data-holding subsystem 704 in a shared enclosure, or such display devices may be peripheral display devices. In some embodiments, computing device 700 may additionally include an audio subsystem including one or more speakers which may be used to present audio representations of data held by data-holding subsystem 704.

When included, imaging subsystem 706 may be used acquire and/or process any suitable image data from various sensors or imaging devices in communication with computing device 700. For example, imaging subsystem may be configured to acquire optical images from a transillumination optical microscope. Imaging subsystem 706 may be combined with logic subsystem 702 and/or data-holding subsystem 704 in a shared enclosure, or such imaging subsystems may comprise periphery imaging devices. Data received from the imaging subsystem may be held by data-holding subsystem 704.

When included, communication subsystem 708 may be configured to communicatively couple computing device 700 with one or more other computing devices. Communication subsystem 708 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing device 500 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed is:

1. A method of imaging a sample illuminated by a light source of a transillumination microscope, the method of imaging a sample illuminated by a light source of a transillumination microscope comprising:
   focusing on a first z-plane of the sample;
   focusing on a second z-plane of the sample;
   measuring the intensity of the light from the light source, said light passing through the sample at the first z-plane and the second z-plane, thereby creating a set of 2-D measurements of the sample;

combining the set of 2-D measurements to form a 3-D image cube;

processing the image cube using a TBFI algorithm, said TFBI algorithm comprising a transport of intensity equation (TIE) and an Eikonal equation.

2. The method of imaging a sample illuminated by a light source of a transillumination microscope of claim 1 wherein the TFBI algorithm further comprises a first convolution theorem and wherein the processing results in a 3-D image cube of phase values.

3. The method of imaging a sample illuminated by a light source of a transillumination microscope of claim 1 wherein the TFBI algorithm further comprises a relation to a refractive index of the sample and a second convolution theorem.

4. The method of imaging a sample illuminated by a light source of a transillumination microscope of claim 3 wherein the processing results in a 3-D image cube of refractive index values.

5. The method of imaging a sample illuminated by a light source of a transillumination microscope of claim 3 wherein the TFBI algorithm further comprises a calibration model and wherein the processing results in a 3-D image cube of mass density profile values.

6. The method of imaging a sample illuminated by a light source of a transillumination microscope of claim 1 further comprising post processing of the 3-D image cube by defining a border of the sample in the 3-D image cube.

7. The method of imaging a sample illuminated by a light source of a transillumination microscope of claim 6 wherein post processing of the 3-D image cube further comprises determining the volume of the sample, determining the dry mass density of the sample, and/or determining the mass of the sample.

8. The method of imaging a sample illuminated by a light source of a transillumination microscope of claim 7 wherein the dry mass density of the sample is calculated using an equation of $n(r_\perp,z)=n_{H_2O}[\alpha(\lambda)C(r_\perp,z)+1]$, where $\alpha(\lambda)$ [dL/g] is a specific refractive increment of cell solids.

9. The method of imaging a sample illuminated by a light source of a transillumination microscope of claim 7 wherein the mass of the sample is calculated using an equation of $M=\int_D C(r_\perp,z)X(r_\perp,z)dr_\perp dz$.

10. The method of imaging a sample illuminated by a light source of a transillumination microscope of claim 7 wherein the mass of the sample is calculated using an equation of $V=\int_D X(r_\perp,z)dr_\perp dz$.

* * * * *